Figure 1:
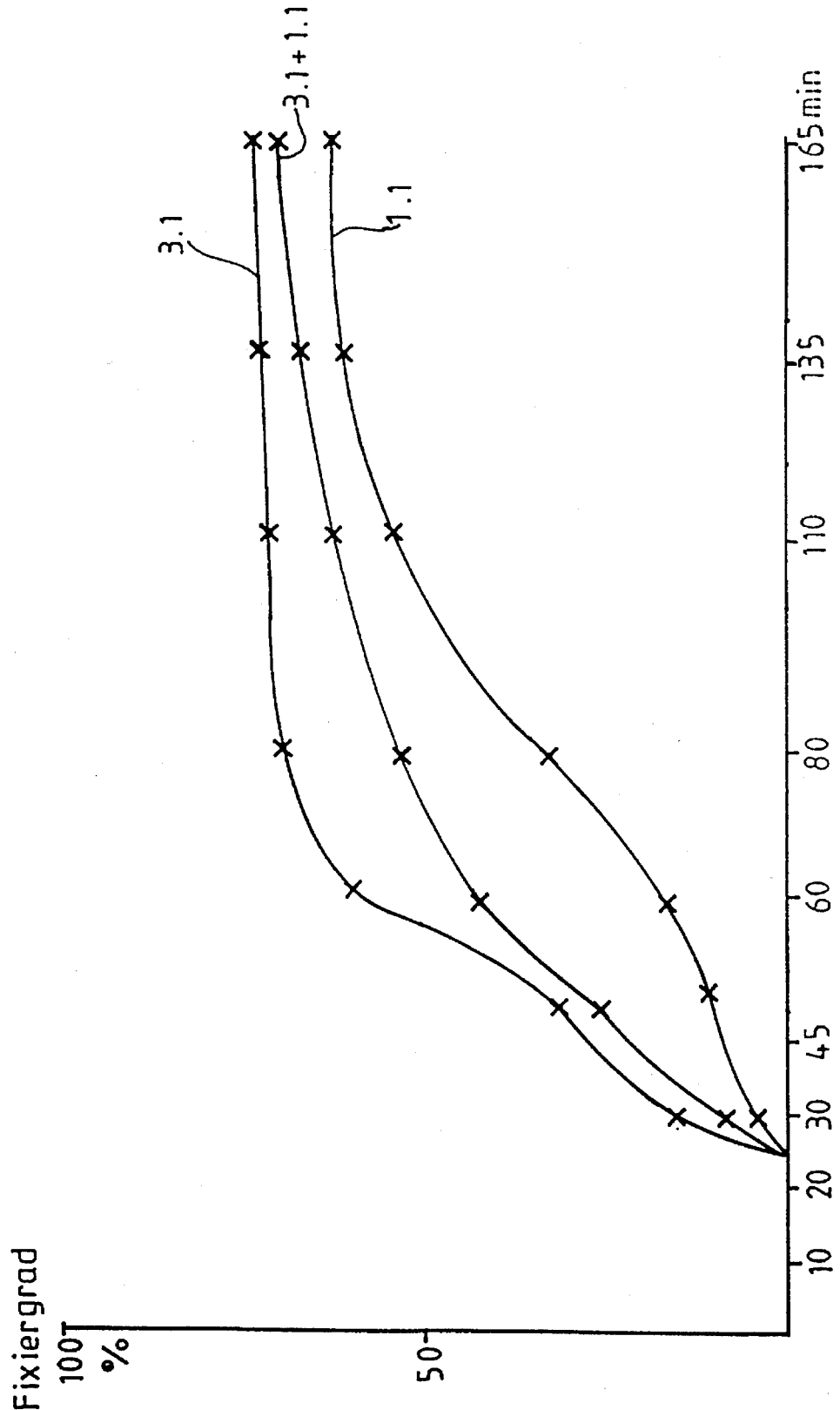

United States Patent [19]

Schwarz et al.

[11] Patent Number: 5,456,728
[45] Date of Patent: Oct. 10, 1995

[54] REACTIVE DYESTUFF MIXTURE HAVING IMPROVED PROPERTIES IN COMBINATION

[75] Inventors: Max Schwarz, Leverkusen; Joachim Grütze, Odenthal; Dietrich Hildebrand, Odenthal; Joachim Wolff, Odenthal; Frank-Michael Stöhr, Odenthal, all of Germany

[73] Assignee: Bayer Aktiengesellschaft, Leverkusen, Germany

[21] Appl. No.: 357,354

[22] Filed: Dec. 14, 1994

Related U.S. Application Data

[63] Continuation of Ser. No. 981,022, Nov. 24, 1992, abandoned.

[30] Foreign Application Priority Data

Dec. 4, 1991 [DE] Germany ............... 41 39 953.6
Dec. 23, 1991 [DE] Germany ............... 41 42 766.1

[51] Int. Cl.⁶ .................... C09B 67/22; C09B 67/24; D06P 1/38
[52] U.S. Cl. .................... 8/549; 8/638; 8/641; 8/681; 8/684; 8/685; 8/686; 8/687; 8/688; 8/918
[58] Field of Search ............... 8/543–549, 638–641, 8/681–688, 918

[56] References Cited

U.S. PATENT DOCUMENTS

| | | | |
|---|---|---|---|
| 3,669,951 | 6/1972 | Bien et al. | 260/146 D |
| 3,910,758 | 10/1975 | Bien et al. | 8/41 R |
| 3,926,942 | 12/1975 | Yelland | 260/146 T |
| 4,007,164 | 2/1977 | Bien et al. | 260/146 D |
| 4,338,093 | 7/1982 | Hildebrand et al. | 8/549 |
| 4,556,706 | 12/1985 | Hegar et al. | 534/618 |
| 4,557,731 | 12/1985 | Sasakura et al. | 8/531 |
| 4,705,524 | 11/1987 | Hahnke et al. | 8/527 |
| 5,047,067 | 9/1991 | Miyazaki et al. | 8/549 |
| 5,071,442 | 12/1991 | Luttringer et al. | 8/549 |
| 5,075,428 | 12/1991 | Jager | 534/637 |

FOREIGN PATENT DOCUMENTS

| | | | |
|---|---|---|---|
| 0043796 | 6/1981 | European Pat. Off. | C09B 43/44 |
| 0224224 | 6/1987 | European Pat. Off. | C09B 67/22 |
| 0300195 | 6/1988 | European Pat. Off. | C09B 67/22 |
| 0377902 | 7/1990 | European Pat. Off. | C09B 62/24 |
| 0437184 | 7/1991 | European Pat. Off. | D06P 1/382 |
| 0478503 | 9/1991 | European Pat. Off. | C09B 67/22 |
| 0485336 | 5/1992 | European Pat. Off. | C09B 67/22 |
| 3201114 | 1/1982 | Germany | C09B 62/01 |
| 3718397 | 6/1987 | Germany | C09B 67/22 |
| 0854432 | 2/1959 | United Kingdom . | |
| 2226336 | 6/1990 | United Kingdom | C09B 67/22 |

OTHER PUBLICATIONS

Chemical Abstracts, vol. 116, No. 2, Jan. 13, 1992, Columbus, Ohio, US; abstract No. 7868m, N. Harada: S. Hashizume "Reactive dye mixture", p. 65, col. 2.

Patent Abstracts of Japan, vol. 15, No. 445 (C–884) (4973) Nov. 13, 1991 & JP–A–31 88 167 (Sumitomo Chem. Col. Ltd.) Aug. 16, 1991.

*Primary Examiner*—Paul Lieberman
*Assistant Examiner*—Margaret Einsmann
*Attorney, Agent, or Firm*—Sprung Horn Kramer & Woods

[57] ABSTRACT

An improved reactive dyestuff mixture comprises at least one monochlorotriazine dyestuff 1 and at least one monofluorotriazine dyestuff 2 and/or fluorochloropyrimidine dyestuff 3, and if appropriate additional dyestuffs having the formulae given in the description.

6 Claims, 3 Drawing Sheets

REACTIVE DYESTUFF MIXTURE HAVING IMPROVED PROPERTIES IN COMBINATION

This application is a continuation-in-part, continuation of application Ser. No. 07/981,022, filed Nov. 24, 1992 now abandoned.

The invention relates to mixtures of reactive dyestuffs which, when used for dyeing cellulose or regenerated cellulose fibres, have improved properties in combination compared with the individual components.

Reactive dyestuffs are used in the form of their individual components or in the form of mixtures of various dyestuffs for dyeing cellulose fibres. In the case of mixtures, the reactivities of the individual components of the mixture should as far as possible be the same or at least similar, in order to ensure that the dyestuffs can be combined during the dyeing process and thus to achieve an "undisturbed" levelness of the goods. If reactive dyestuffs have widely varying reactivities, they are regarded as belonging to dyestuff ranges which differ from one another and which have to be used under different alkali and temperature conditions. According to current usage, reactive dyestuffs are classified into three groups on the basis of their different reactivity: reactive dyestuffs of high reactivity which can already be used for dyeing below 40° C. are called cold-dyeing dyes, dyestuffs which are used at 40° to 60° C. are called warm-dyeing dyes and dyestuffs which are used in the region of 80° C. are called hot-dyeing dyes. The different use temperatures resulting from the reactivity of the dyestuff accordingly require different substantivity properties. The substantivity of a dyestuff is a condition of absorption from the dye liquor onto the fibre, before true fixing occurs by addition of alkali. A higher dyeing temperature therefore necessarily requires a high substantivity, in order to achieve an economically acceptable fixing yield. On the basis of their different reactivity and substantivity, the three groups of dyestuff ranges of different reactivity are applied by means of process instructions typical of the group.

The difference between using a warm-dyeing dye and a hot-dyeing dye is a dyeing temperature which is 20 to 40° C. higher for the hot-dyeing dye, an electrolyte concentration which is 40 g/l of sodium chloride higher and a sodium carbonate concentration of the dyebath which is 10 g/l higher. It is therefore considered that reactive dyestuffs of the warm-dyeing dye type and those of the hot-dyeing dye type cannot be applied in one dyebath.

Reactive dyestuffs for dyeing cellulose fibres are used in particular for dyeing articles which require a high fastness to washing in deep fashionable shades. It is of particular interest here to achieve deep dyeings of high levelness. There are considerable technical limitations on establishing level deep dyeings on the basis of a uniform reactive dyestuff molecule by means of the dyestuffs currently available on the market. Known dyestuffs of high brilliance from the warm-dyeing dye range as a rule have a lack of solubility in the presence of the electrolyte addition necessary for the reaction yield. In addition, they have a high level of reactivity towards cotton, and therefore tend to be absorbed unevenly and fixed hastily, especially on short liquor dyeing units, so that their use in this respect is limited.

Dyestuffs from the hot-dyeing dye range have a higher solubility and lower reactivity, but prove to be unsuitable for many practical requirements, since the necessary robustness towards variable alkali, salt and temperature conditions and different liquor ratios is not achieved. Although reactive dyestuff mixtures of improved solubility comprising reactive dyestuffs which each correspond to one reactive type, that is to say are called either warm-dyeing dyes or a hot-dyeing dye mixture, are known, these have the disadvantage that their use is limited to a dyeing temperature of 50° C. or of 80° C., which is a restriction on their applicability.

The temperature region of 60° C. has the advantage for dyehouses that dyeing can be carried out with a significantly reduced amount of electrolyte compared with the 80° C. method, which means that a considerable reduction in pollution of the wastewater and therefore a saving in environment-relevant costs are achieved.

When the reactive dyestuff mixtures currently common in practice are used for dyeing, the shade greatly depends on various dyeing conditions, such as varying liquor ratios and salt and temperature conditions.

The invention is based on the object of providing reactive dyestuff mixtures which, while having a good fixing yield, display a uniform course of the fixing curve which is superior to that of the individual dyestuffs, which means that standardisation of the salt, alkali and temperature conditions for all the depths of colour of a combination is rendered possible.

The dyestuff mixture should have a high solubility and insensitivity to electrolytes, and display reproducible dyeing properties which are level over the entire area and are of constant shade under variable temperature, alkali and liquor conditions.

The present invention relates to a dyestuff mixture of at least two reactive dyestuffs, characterised in that at least one monochlorotriazine dyestuff 1 of the formulae 1.1 to 1.7

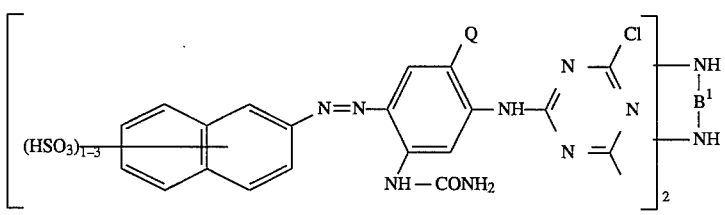

1.1

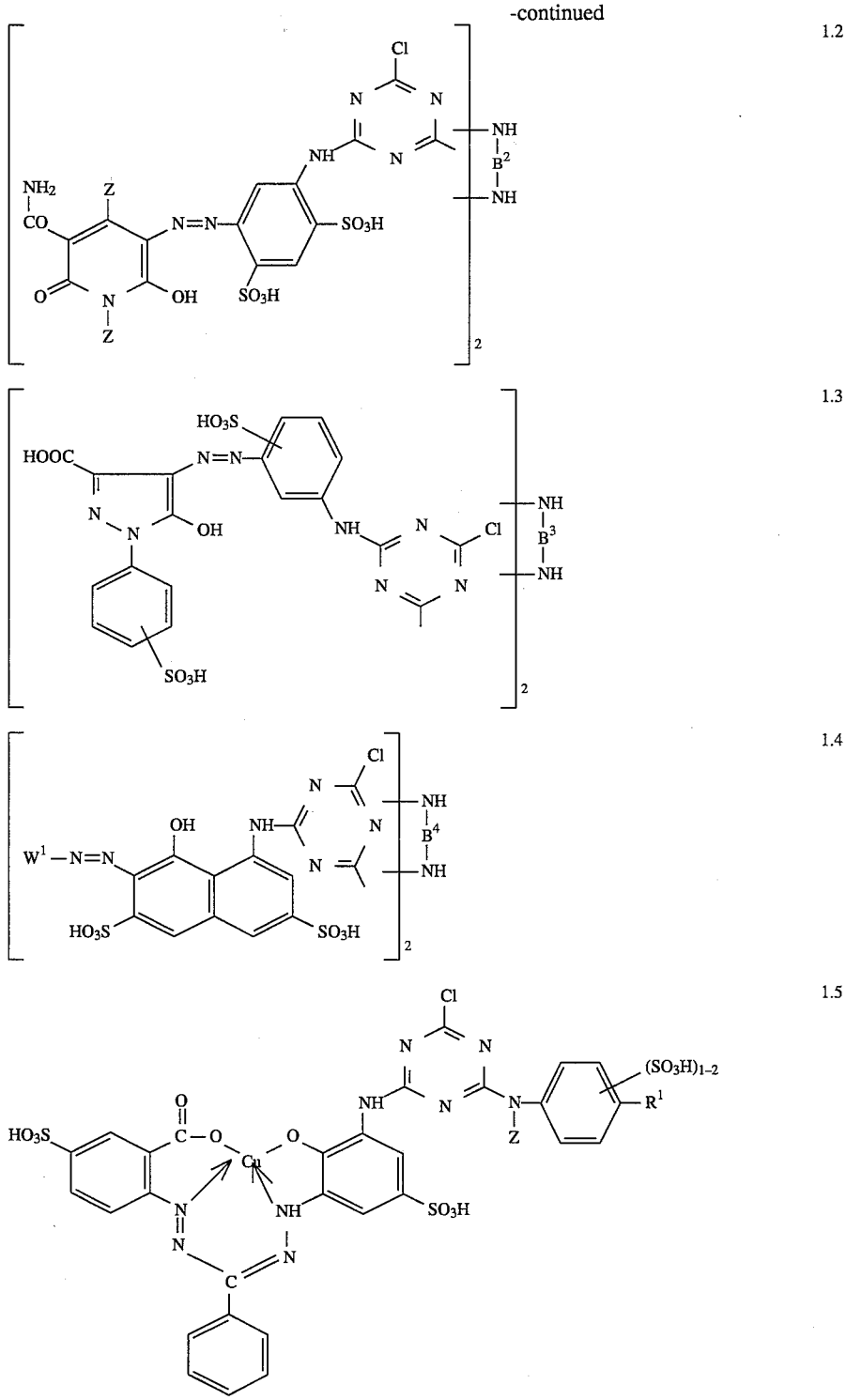

1.6
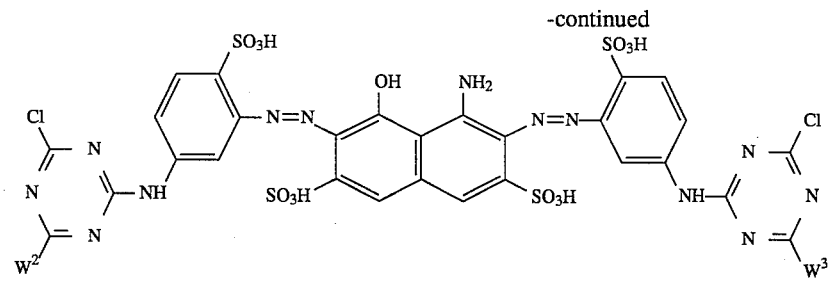
1.7
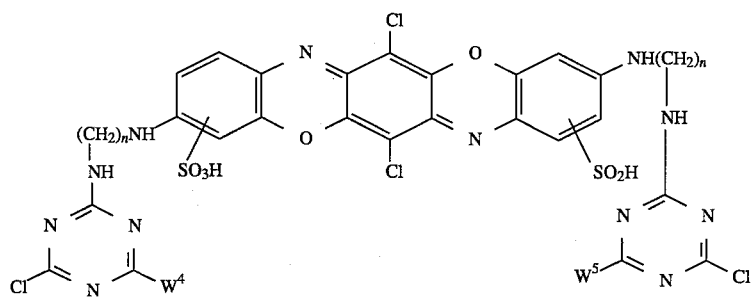
and at least one monofluorotriazine dyestuff of the formula 2.1 to 2.7 and/or one fluorochloropyrimidine dyestuff of the formula 3.1 to 3.5
2.1
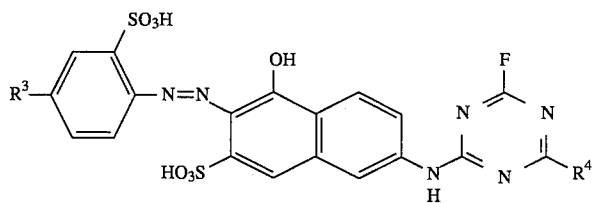
2.2
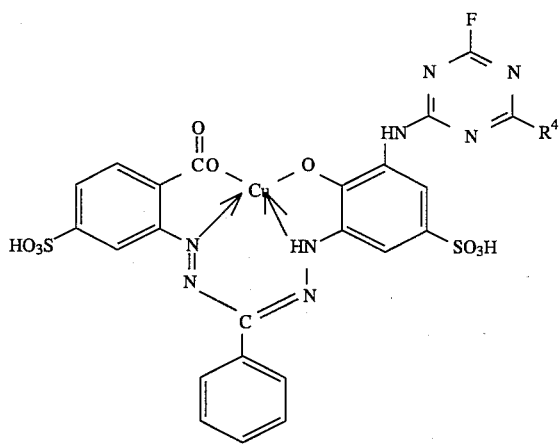
2.3
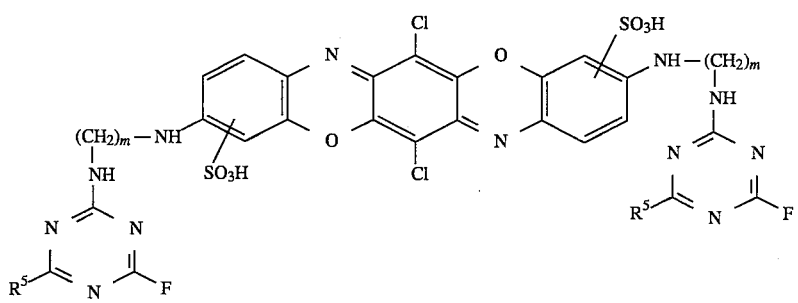

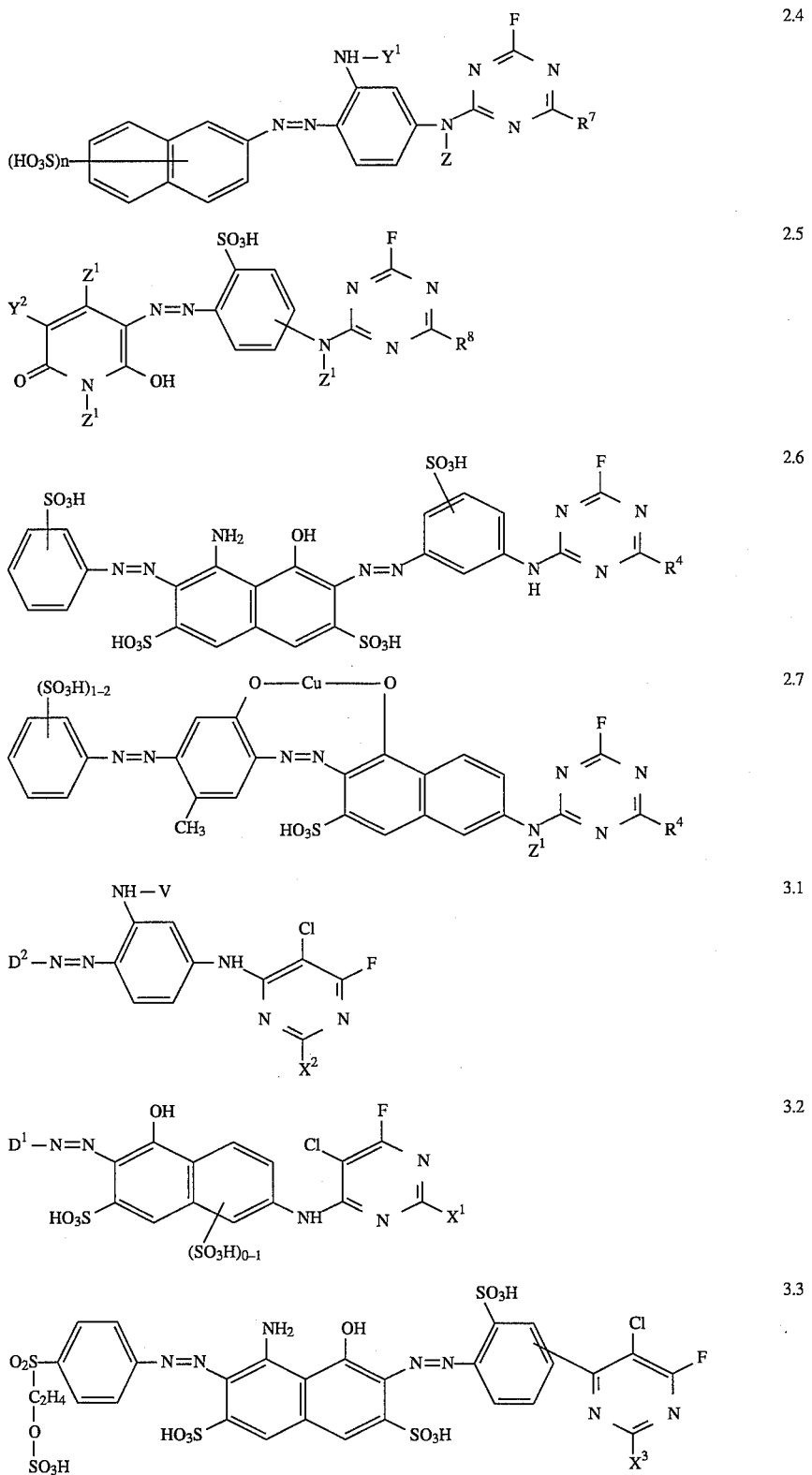

-continued
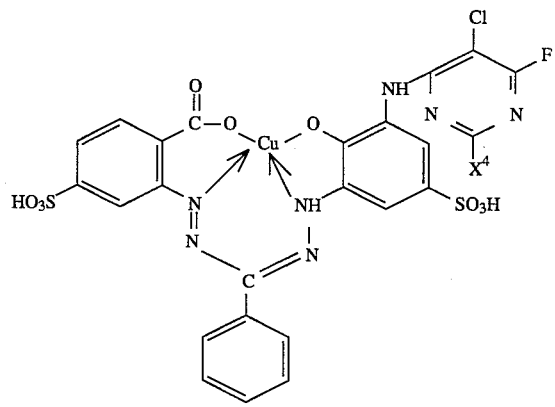
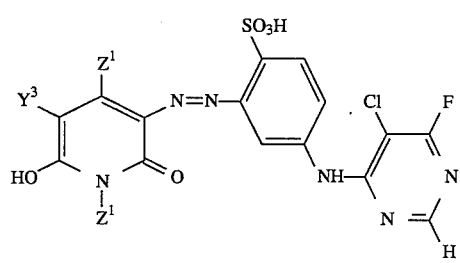
are used, wherein
$B^1$–$B^4$ independently of one another denote
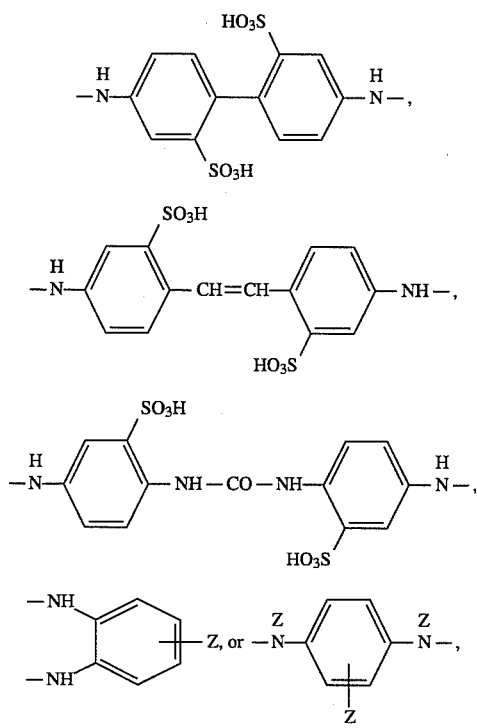
Q denotes O—CH$_3$ or H,
3.4
3.5
$R^1$ denotes —SO$_2$—CH$_2$—CH$_2$OSO$_3$H or
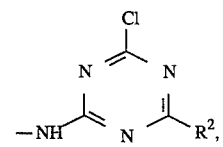
$R^2$ denotes —NH—Z, —NH—CH$_2$—CH$_2$—SO$_3$H,
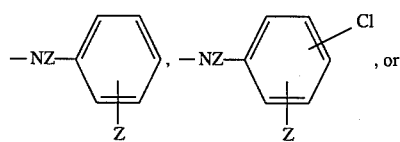
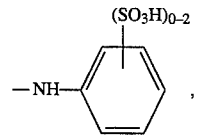
$R^3$ denotes
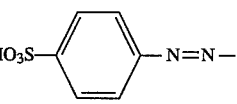
or H$_3$CO—,
$R^4$–$R^8$ independently of one another denoted —NH—$Z^1$,

—NH—CH$_2$—CH$_2$—SO$_3$H,

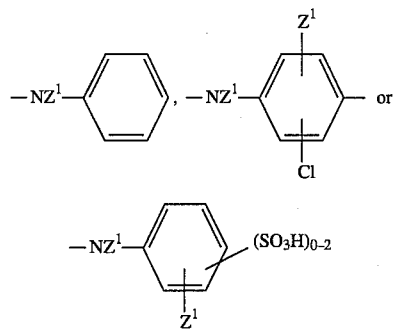

the radicals Z independently of one another denote H or C$_2$–C$_4$-alkyl, the radicals Z$^1$ independently of one another denote H or C$_1$–C$_4$-alkyl, the radicals V independently of one another denote CONH$_2$ or COCH$_3$, W$^1$ denotes

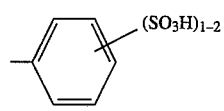

W$^2$–W$^5$ independently of one another denote

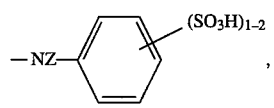

X$^1$–X$^4$ independently of one another denote H or F,

Y$^1$–Y$^3$ denote —CONH$_2$—, COCH$_3$ or —(CH$_2$)$_m$—SO$_3$H,

D$^1$ and D$^2$ denote

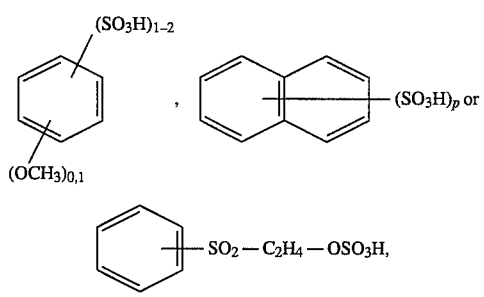

the indices m independently of one another denote 1–4, the indices n independently of one another denote 2–4 and the indices p independently of one another denote 1–3.

In a particularly preferred embodiment, the mixture furthermore comprises the dyestuff 4.1 of the following formula

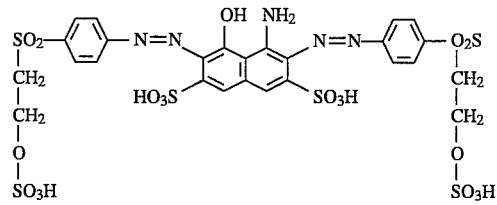

Particularly preferred mixtures are given below:
Mixture 1: dyestuffs 1.1, 1.4 and 3.2
Mixture 2: dyestuffs 1.2 and 2.5
Mixture 3: dyestuffs 1.3 and 2.4
Mixture 4: dyestuffs 1.1, 1.4 and 2.1
Mixture 5: dyestuffs 1.5 and 2.2
Mixture 6: dyestuffs 1.6, 3.3 and 4.1
Mixture 7: dyestuffs 1.7 and 2.2
Mixture 8: dyestuffs 1.7 and 2.3
Mixture 9: dyestuffs 1.3 and 3.1
Mixture 10: dyestuffs 1.7 and 2.6
Mixture 11: dyestuffs 1.7 and 2.7
Mixture 12: dyestuffs 1.7 and 3.4
Mixture 13: dyestuffs 1.5 and 3.4
Mixture 14: dyestuffs 1.5, 3.4 and 4.1
Mixture 15: dyestuffs 1.6, 3.3 and 4.1
Mixture 16: dyestuffs 1.2 and 3.5

In a preferred embodiment, the mixtures comprise, based on the total dyestuff content:

Dyestuff 1: 40 to 60, in particular 40 to 55% by weight
Dyestuff 2: 0 to 60, in particular 50 to 60% by weight
Dyestuff 3: 0 to 60, in particular 32 to 50% by weight
Dyestuff 4: 0 to 60, in particular 0 to 13% by weight The mixtures according to the invention are particularly suitable for dyeing by the exhaustion process, preferably in accordance with the following plan:

| Time (min.) | Temp. (°C.) | Measure |
| --- | --- | --- |
| 0 | 30° C. | Dyestuff addition |
| 10 | 30 | Electrolyte addition (50 g/l of sodium chloride) |
| 20 | 30 | Alkali addition (20 g/l of sodium carbonate, anhydrous) |
| 30 | 30 | Start of the heating up |
| 60 | 60 | phase at 1°/minute |
| 150 | 60 | Draining and filling up |
| 160 | 50 | Warm rinsing |
| 170 | 50 | Draining and filling up |
| 180 | 50 | Warm rinsing |
| 190 | 50 | Draining and filling up |
| 200 | 80 | Hot rinsing |
| 210 | 80 | Draining and filling up |
| 210 | 80 | Hot rinsing |
| 220 | 80 | Draining and filling up |
| 235 | 95 | Hot washing |
| 240 | 95 | Hot draining in overflow |
| 245 | 80 | Warm rinsing in overflow |
| 250 | 20 | Cold rinsing |
| 260 | 20 | Removal of dyed goods. |

Dyestuff mixtures are already known from EP-A-478 503, but there is no indication of the mixtures according to the invention.

The dyestuff mixture can preferably be used for dyeing cotton and other cellulose fibres by the exhaustion process on customary dyeing units.

Other dyestuffs or customary auxiliaries can additionally be employed. In particular, the dyestuff mixtures according to the invention comprise 1 to 50 parts of an inorganic salt, such as, for example, sodium chloride or sodium sulphate, per 100 parts of dyestuff. The mixtures according to the invention furthermore preferably comprise a buffer, in particular an inorganic buffer, which results in a buffering range of between pH 6.5 and 7.5. For better handling, the mixtures according to the invention preferably comprise dispersing agents, in particular 0.5 to 10 parts by weight of an organic anionic dispersing agent, based on the total mixture, and a dust removal agent, preferably 0.5 to 5 parts by weight, based on the total mixture.

EXAMPLE 1

100 parts of knitted cotton fabric and 2 parts of reactive dyestuff mixture are added to 1000 parts of an aqueous dye liquor at 30° C. The mixture comprises in each case 1 part of the dyestuff 1.1 and of the dyestuff 3.1 of the formulae

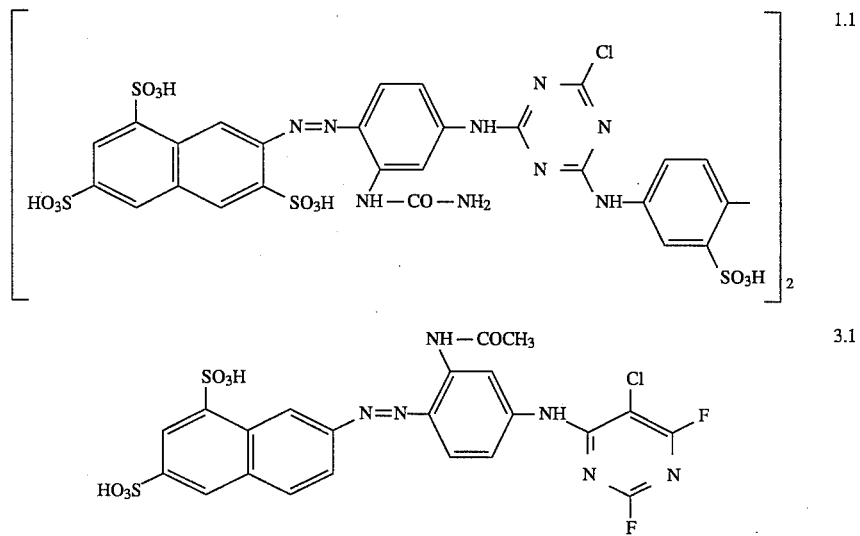

After the dyestuff mixture has been distributed uniformly in the liquor and on the cotton, 50 parts of sodium chloride are added to the dye liquor, and 20 parts of sodium carbonate are then added. This dye liquor is heated to 60° C. in the course of 30 minutes, with vigorous agitation of the liquor and goods, and left at this temperature for 90 minutes.

The liquor is then drained and the goods are rinsed twice at 50° C. and twice at 80° C. They are then soaped at the boil for 15 minutes and rinsed cold. A level yellow dyeing having good fastness properties is obtained.

If the individual dyestuffs of the dyestuff mixtures are used for dyeing in accordance with this dyeing plan, the fixing curves shown in FIG. 1 result.

After addition of the fixing agent at 30° C., the more reactive dyestuff 3.1 starts to react immediately with the cellulose fibre.

When the main reaction slows down, the heating up phase to the final temperature of 60° C. starts, while renewed acceleration of the reaction is observed.

A short time after 60° C. is reached, the fixing curve passes into the horizontal part; dyeing has ended.

The less reactive dyestuff 1.1 initially reacts slowly with the fibre under the chosen starting conditions. During the heating up phase, however, a significant increase in the rate of reaction occurs.

If dyeing is carried out with a mixture of the dyestuffs 1.1 and 3.1, the individual components in the mixture exhibit more harmonious absorption properties compared with the typical dyestuff, this manifesting itself in an absorption curve which is flatter compared with the fixing curve of 3.1 and steeper compared with the fixing curve of 1.1; that is to say the dyestuff 1.1, which is slower to react, is fixed faster in the mixture under the same fixing conditions than corresponds to its typical fixing properties.

The fact that the dyestuffs mixed with one another follow a common fixing curve, which is a measure of the positive mutual influencing of the dyestuffs, is unexpected and surprising.

It is furthermore surprising that the more reactive component of the mixture dyes the material uniformly and with a high yield, in spite of the chosen fixing conditions, which are apparently too severe. On the other hand, the less reactive component of the mixture achieves good end yields, in spite of the reaction conditions which are apparently too "mild".

EXAMPLE 2

100 parts of knitted cotton fabric are treated at 30° with 1000 parts of an aqueous dye liquor which comprises 4 parts of a formulated scarlet mixture consisting of 50 parts of dyestuff 2.1

14.5 parts of dyestuff 1.4 and 25.5 parts of dyestuff 1.1 of the formulae

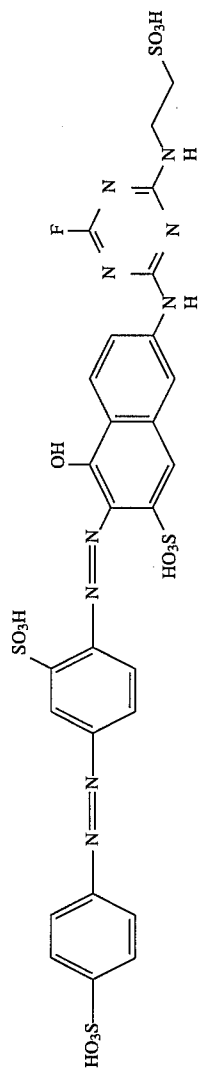
2.1
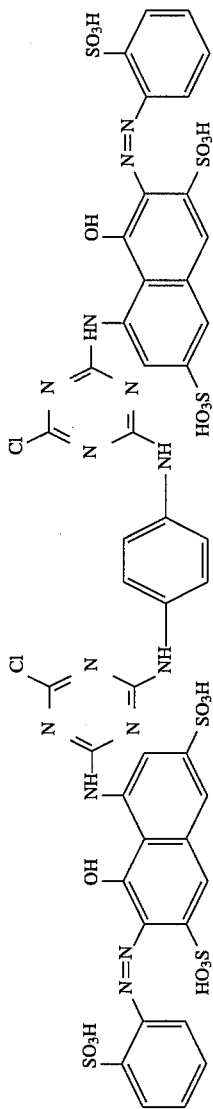
1.4
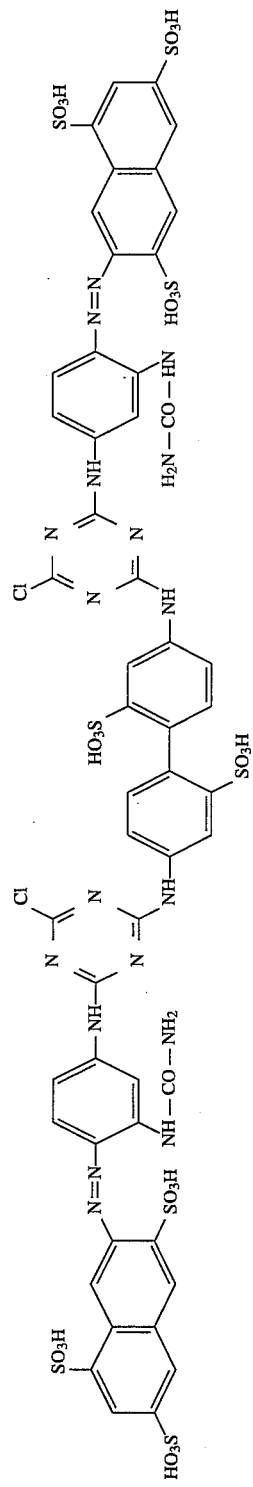
1.1 and

½ part of sodium bicarbonate, 50 parts of sodium chloride and 20 parts of sodium carbonate (anhydrous) in solution.

After the dyestuff has been distributed uniformly on the fibre material at 30° C. for 45 minutes, the liquor is heated to 60° C. in the course of 30 minutes, with vigorous agitation of the goods and good circulation of the liquor, and the goods are treated at this temperature for 90 minutes. The liquor is then drained and the goods are rinsed twice at 50° C. and twice at 80° C. The bath is then filled up with fresh liquor and heated to 98° C. After 10 minutes, the liquor is drained and the goods are treated again at 98° C. for 10 minutes. The liquor is then drained and the goods are rinsed cold. A brilliant scarlet dyeing having good fastness properties is obtained.

After the goods have been treated at this temperature for 30 minutes, the liquor is heated to 60° C. for 30 minutes, and dyeing is carried out for a further 30 minutes at this temperature, with vigorous circulation of the liquor and agitation of the goods.

The liquor is then drained and the goods are rinsed twice at 50° and twice at 80° C., and treated at boiling point twice for in each case 10 minutes. They are then rinsed cold.

A very clear scarlet dyeing having good fastness properties is obtained.

EXAMPLE 3

100 parts of knitted cotton goods and 2 parts of reactive dyestuff mixture are added to 1000 parts of an aqueous dye liquor at 30° C. The mixture comprises in each case 1 part of the dyestuffs 2.2 and 1.5 of the formulae:

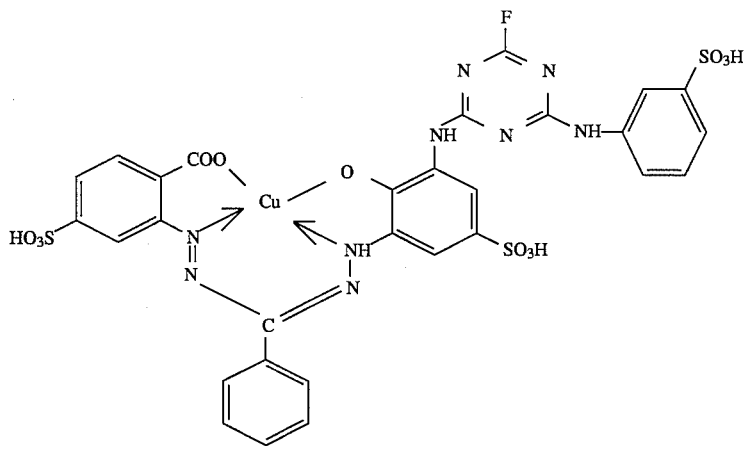

2.2

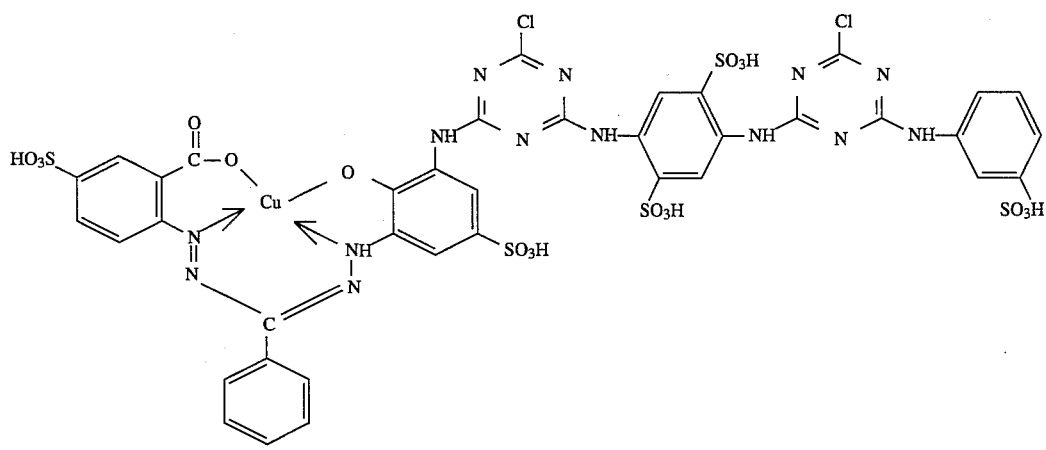

1.5

EXAMPLE 2a 100 parts of knitted cotton goods are treated on a short liquor jet at 30° C. with 400 parts of an aqueous liquor which comprises 4 parts of a scarlet mixture of dyestuffs according to Example 2 and 0.5 part of sodium bicarbonate, 15 parts of sodium carbonate (anhydrous) and 30 parts of sodium chloride in solution.

When the dyestuff mixture has been distributed uniformly in the liquor and on the cotton, 50 parts of sodium chloride are added to the dye liquor, and 20 parts of sodium carbonate are then added. This dye liquor is heated to 60° C. in the course of 30 minutes, with vigorous agitation of the liquor and goods, and left at this temperature for 90 minutes.

The liquor is then drained and the goods are rinsed twice at 50° C. and twice at 80° C. They are then soaped at the boil for 15 minutes and rinsed cold. A level blue dyeing having good fastness properties is obtained.

Figure 2:
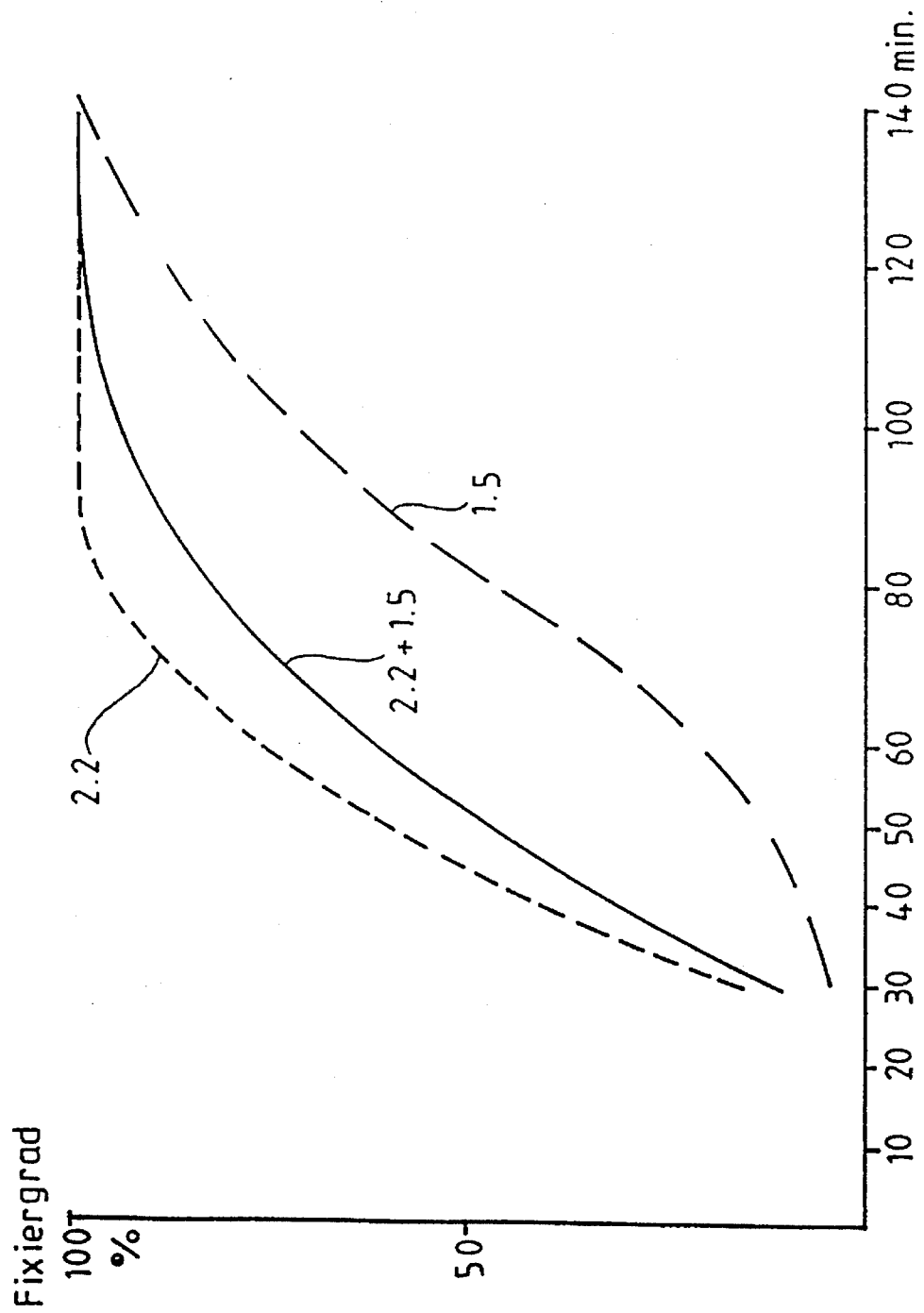

If the individual dyestuffs of the dyestuff mixtures are used for dyeing, the fixing curves shown in FIG. 2 result.

After addition of the fixing agent at 30° C., the more reactive dyestuff 2.2 immediately starts to react with the cellulose fibre. When the main reaction slows down, the heating up phase to the end temperature of 60° C. starts, while renewed acceleration of the reaction is observed.

A short time after 60° C. is reached, the fixing curve passes into the horizontal part; dyeing has ended.

The less reactive dyestuff 1.5 initially reacts slowly with the fibre under the chosen starting conditions. During the heating up phase, however, a significant increase in the rate of reaction occurs.

If dyeing is carried out with a mixture of the dyestuffs 2.2 and 1.5, the individual components in the mixture exhibit more harmonious absorption properties compared with the typical dyestuff, which manifest themselves in a fixing curve which is flatter compared with the fixing curve of 2.2 and steeper compared with the absorption curve of 1.3. That is to say, the dyestuff 1.5, which is slower to react, is fixed more rapidly in the mixture under the same fixing conditions than corresponds to its typical fixing properties.

EXAMPLE 4

100 parts of knitted cotton goods are treated on a jet dyeing unit at 30° C. with 1000 parts of an aqueous liquor which comprises 5 parts of the reactive dyestuff navy blue mixture consisting of 32 parts of the dyestuff 3.3, 55 parts of the dyestuff 1.6 and 13 parts of the dyestuff 4.1, and 0.5 part of sodium bicarbonate, 20 parts of sodium carbonate (anhydrous) and 60 parts of sodium chloride in solution.

The dyestuffs correspond to the formulae:

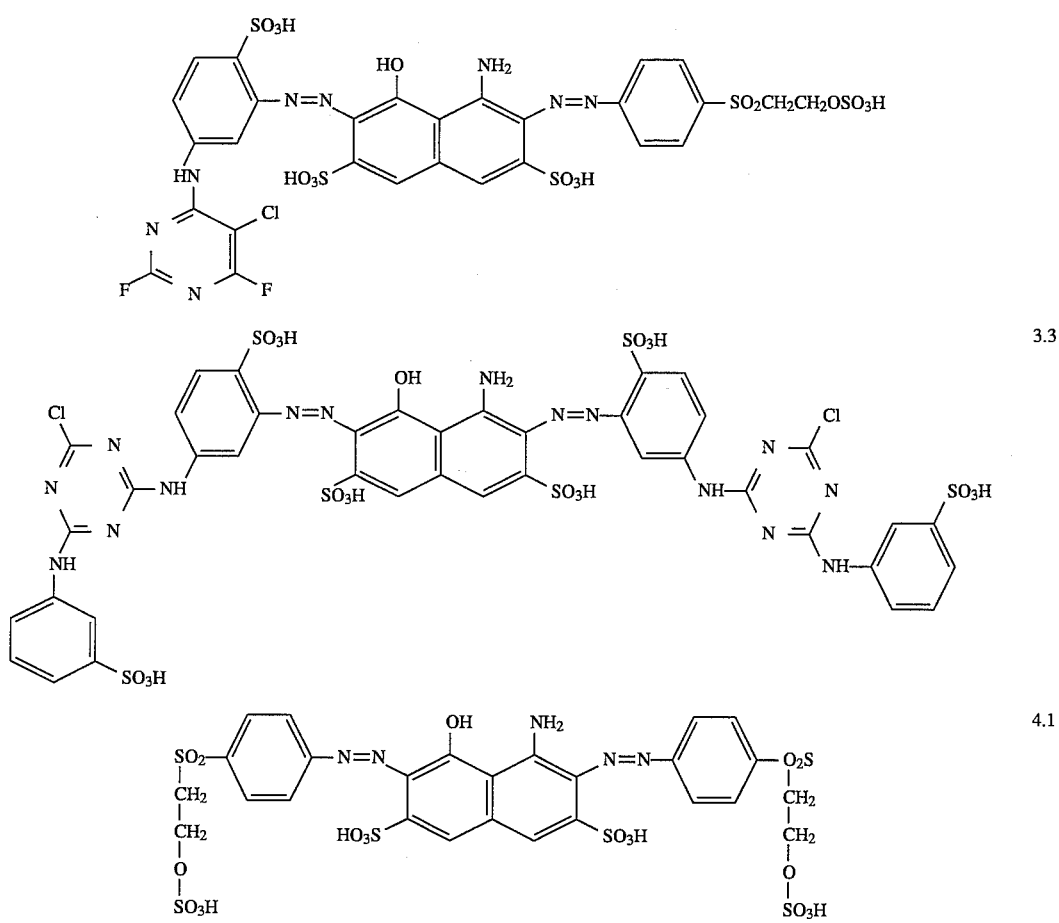

After the absorbed dyestuff has been distributed uniformly on the cellulose fibre material, the bath is heated uniformly to 60° C. in the course of 30 minutes, and dyeing is carried out for a further 90 minutes at this temperature, with vigorous circulation of the liquor and agitation of the goods.

The liquor is then drained and the goods are rinsed twice cold and hot and treated at the boil twice for in each case 15 minutes. A level navy blue dyeing having good fastness properties is obtained.

EXAMPLE 5

100 parts of knitted cotton fabric and 2 parts of reactive dyestuff mixture are added to 1000 parts of an aqueous dye liquor at 30° C. The mixture comprises in each case 1 part of the dyestuff 2.2 and 1.7 of the formulae

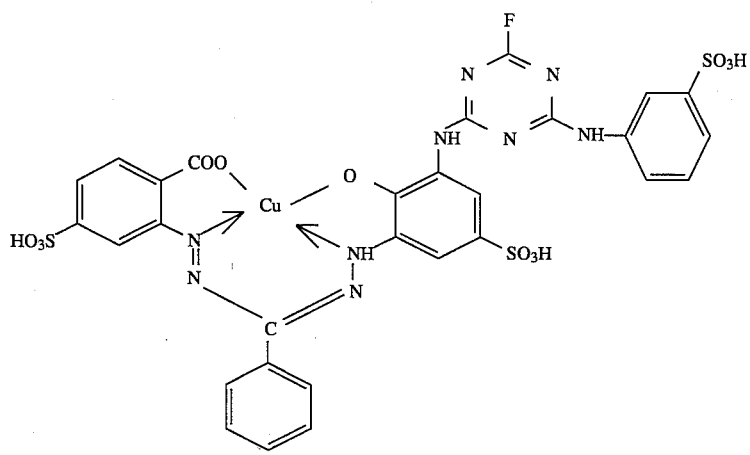

2.2

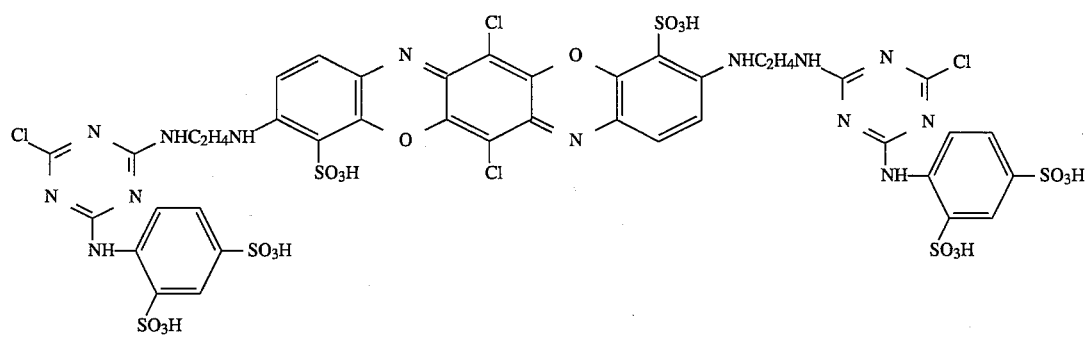

1.7

After the dyestuff mixture has been distributed uniformly in the liquor and on the cotton, 50 parts of sodium chloride are added to the dye liquor, and 20 parts of sodium carbonate are then added. The dye liquor is heated to 60° C. in the course of 30 minutes, with vigorous agitation of the liquor and goods, and is left at this temperature for 90 minutes.

The liquor is then drained and the goods are rinsed twice at 50° C. and twice at 80° C. They are then soaped at the boil for 15 minutes and rinsed cold. A level blue dyeing having good fastness properties is obtained.

Figure 3:
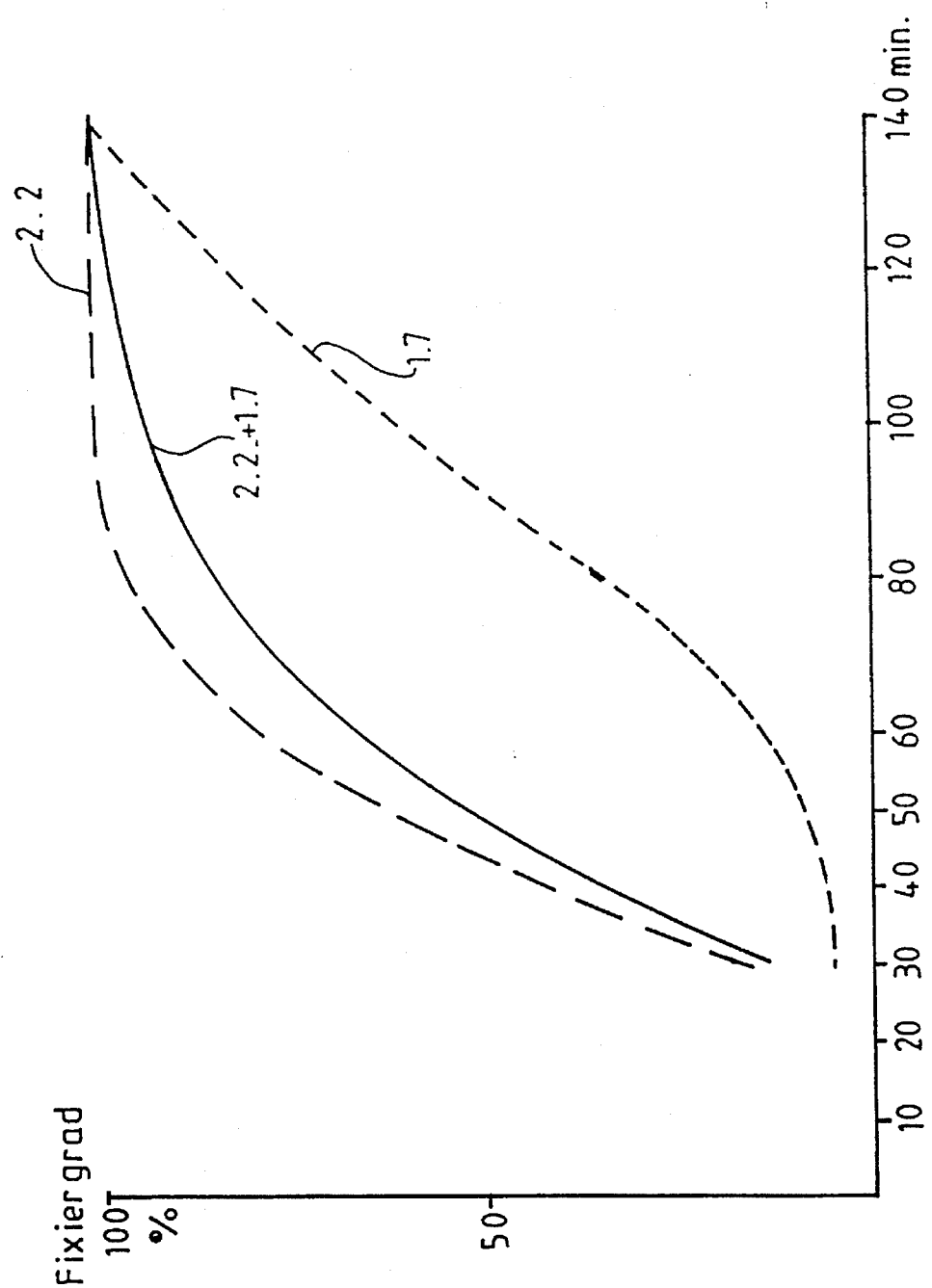

If the individual dyestuffs of the dyestuff mixtures are used for dyeing, the fixing curves shown in FIG. 3 result.

The more highly reactive dyestuff 2.2 starts to react immediately with the cellulose fibre after addition of the fixing agent at 30° C. When the main reaction slows down, the heating up phase to the end temperature of 60° C. starts, during which renewed acceleration of the reaction is observed.

A short time after 60° C. is reached, the fixing curve passes into the horizontal part; dyeing has ended.

The less reactive dyestuff 1.7 initially reacts slowly with the fibre under the chosen starting conditions. During the heating up phase, however, a significant increase in the rate of reaction occurs.

If dyeing is carried out with a mixture of the dyestuffs, the individual components in the mixture exhibit more harmonious absorption properties compared with the typical dyestuff, which manifest themselves in a fixing curve which is flatter compared with the fixing curve of 2.2 and steeper compared with the fixing curve of 1.7, That is to say, the dyestuff which is slower to react is fixed more rapidly in the mixture claimed under the same fixing conditions than corresponds to its typical fixing properties.

EXAMPLE 6

100 parts of a bleached cotton yarn are treated in a yarn dyeing apparatus with 900 parts of an aqueous dye liquor which is heated at 60° C. and comprises 1 part of the dyestuff 1.2, 1 part of the dyestuff 3.5, 1 part of the dyestuff 1.7 and 1 part of the dyestuff 2.3, as well as 0.8 part of sodium bicarbonate. The dyestuffs correspond to the formulae

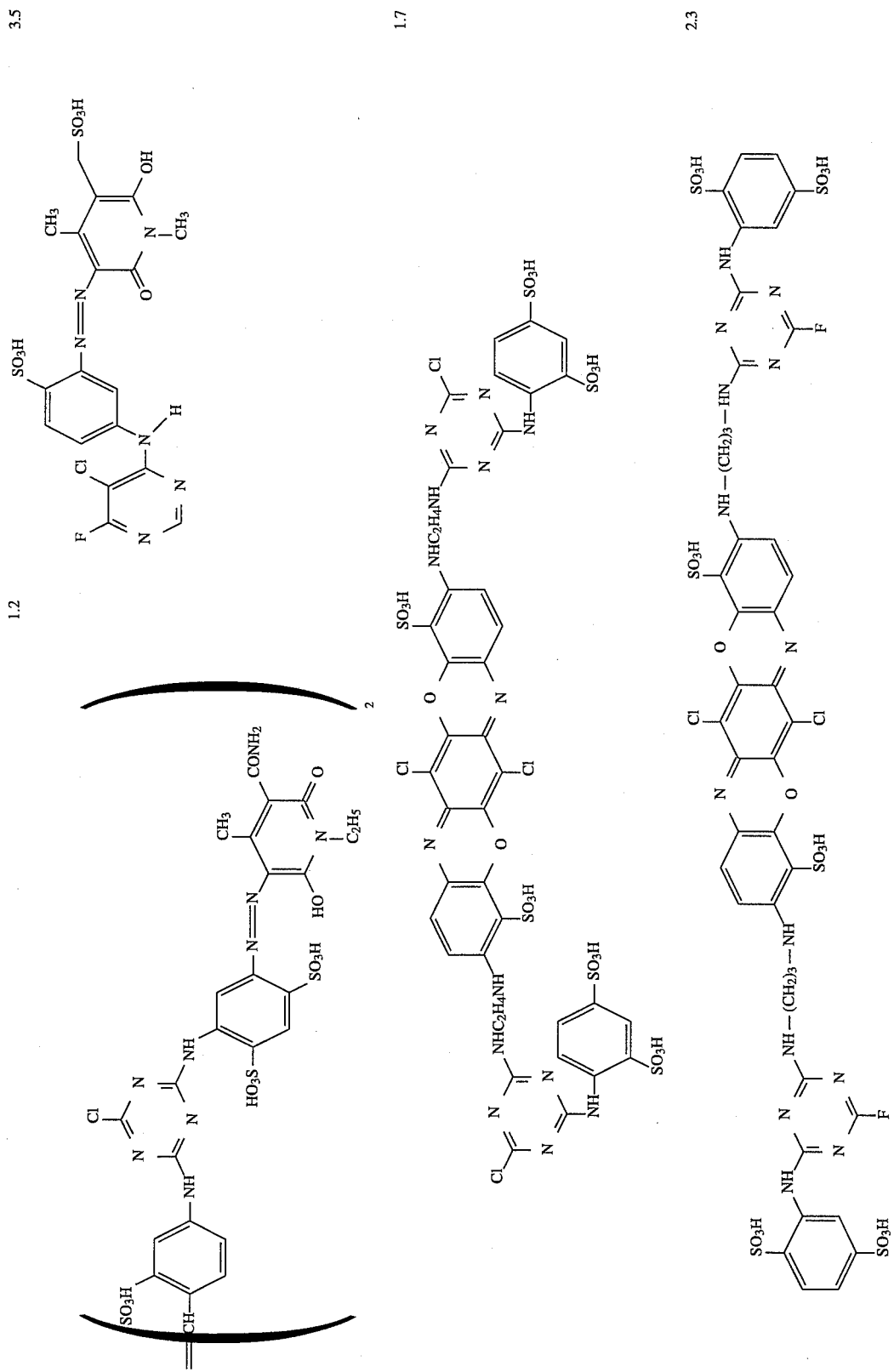

When the dyestuff mixture has been distributed uniformly in the liquor and on the cotton, a total of 60 parts of anhydrous sodium sulphate are added to the dye liquor in two portions each of ⅓ and ⅔ of the total amount, at an interval of 15 minutes, and the liquor is circulated at 60° C. for a further 15 minutes. 100 parts of an alkali solution comprising 4 parts of anhydrous sodium carbonate and 2 parts of 50% strength sodium hydroxide solution, made up to 100 parts with water, are then metered into the dyebath via the stock tank of the dyeing apparatus by means of linear metering over the course of 1 hour.

When the metering operation has ended, dyeing is carried out at the same temperature for a further 15 minutes.

The liquor is then drained, and the goods are rinsed twice at 50° C. and twice at 80° C., subsequently extracted at the boil for 10 minutes and rinsed cold. A level green dyeing having good fastness properties is obtained.

EXAMPLE 7

100 parts of bleached knitted cotton goods are treated on a winch vat with 2000 parts of an aqueous dye liquor which is heated at 60° C. and comprises 0.7 part of the dyestuff 1.1, 0.54 part of the dyestuff 1.4 and 0.8 part of the dyestuff 1.5, as well as 0.72 part of the dyestuff 3.1, 0.61 part of the dyestuff 2.1, 0.29 part of the dyestuff 2.2 and 0.30 part of the dyestuff 3.4, and furthermore 0.5 part of a commercial wetting agent and 2 parts of a commercial dyeing auxiliary to improve the laying of the goods in the machine. The dyestuffs correspond to the formulae

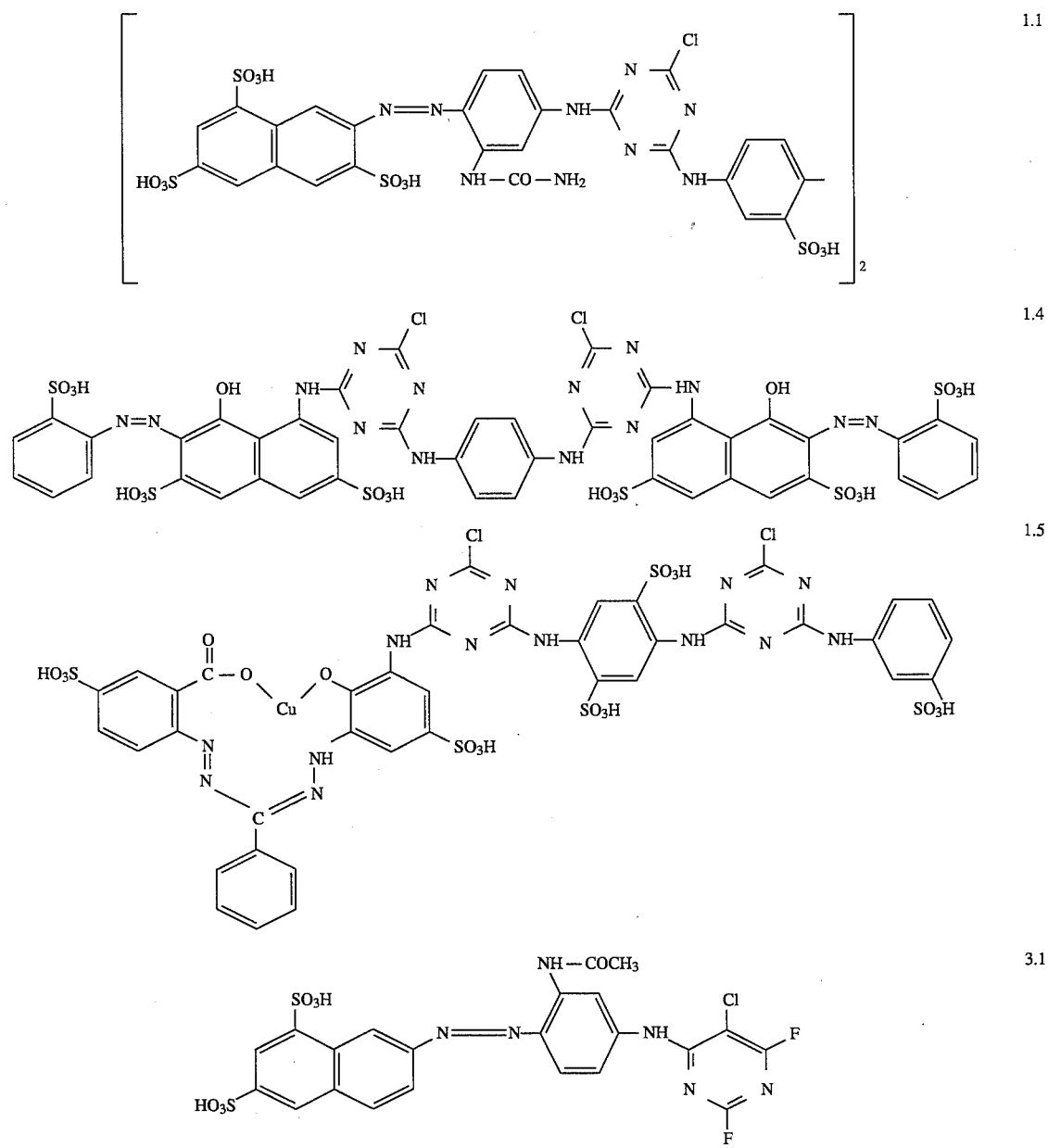

-continued

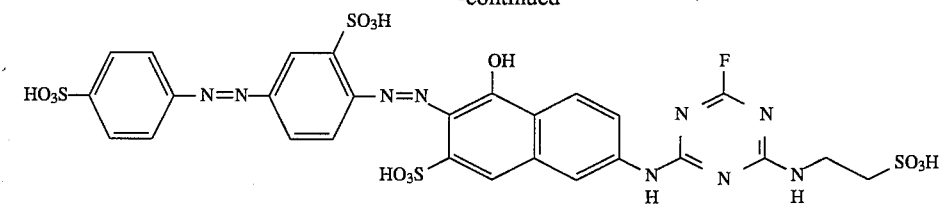

2.1

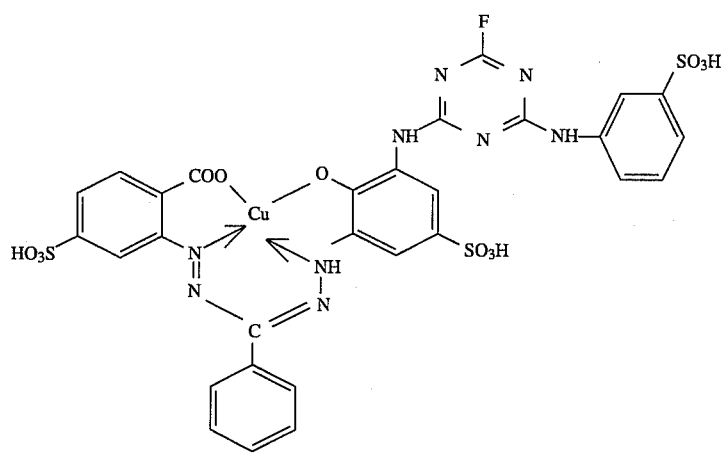

2.2

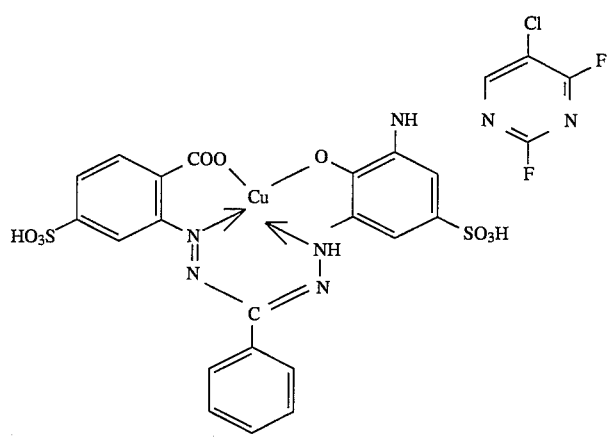

3.4

0.8 part of sodium bicarbonate is added to the liquor. When the dyestuff mixture has been distributed uniformly in the liquor and on the cotton, 50 parts of sodium chloride are added to the liquor in 4 portions each of 1/10, 2/10, 3/10 and 4/10 of the total amount, at intervals of in each case 10 minutes, and the apparatus is allowed to run at 60° C. for a further 10 minutes. 20 parts of sodium carbonate in solid form are then introduced slowly into the dyebath in two portions of 2/10 and 8/10 of the total amount, at an interval of 30 minutes, the dyebath is then heated to 80° C. in the course of 20 minutes and dyeing is carried out at this temperature for 30 minutes.

The liquor is then drained and the goods are rinsed twice at 50° C. and twice at 80° C., subsequently extracted at the boil for 15 minutes and rinsed cold.

A deep brown dyeing having good fastness properties is obtained.

We claim:

1. Dyestuff mixture of at least two reactive dyestuffs, characterised in that at least one monochlorotriazine dyestuff 1 of the formulae 1.1 to 1.7

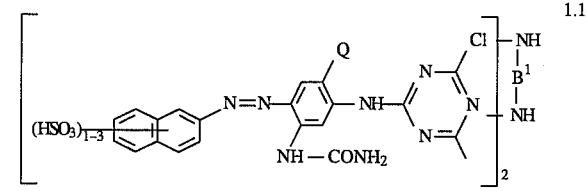

1.1

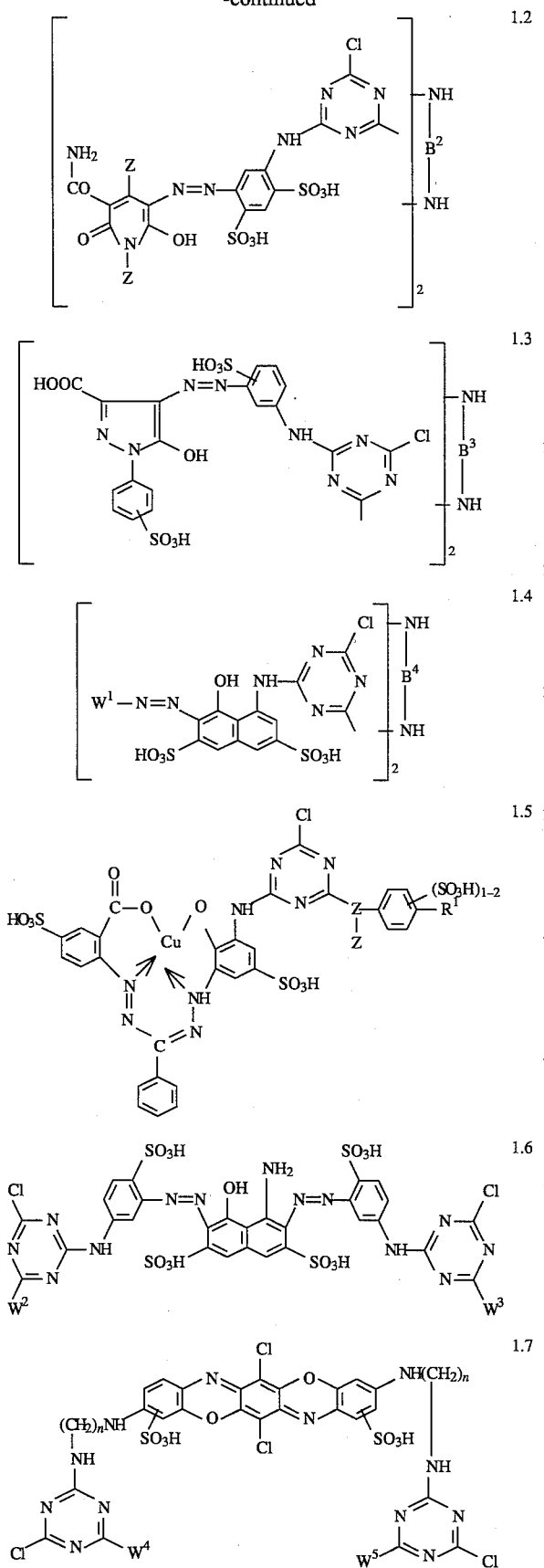
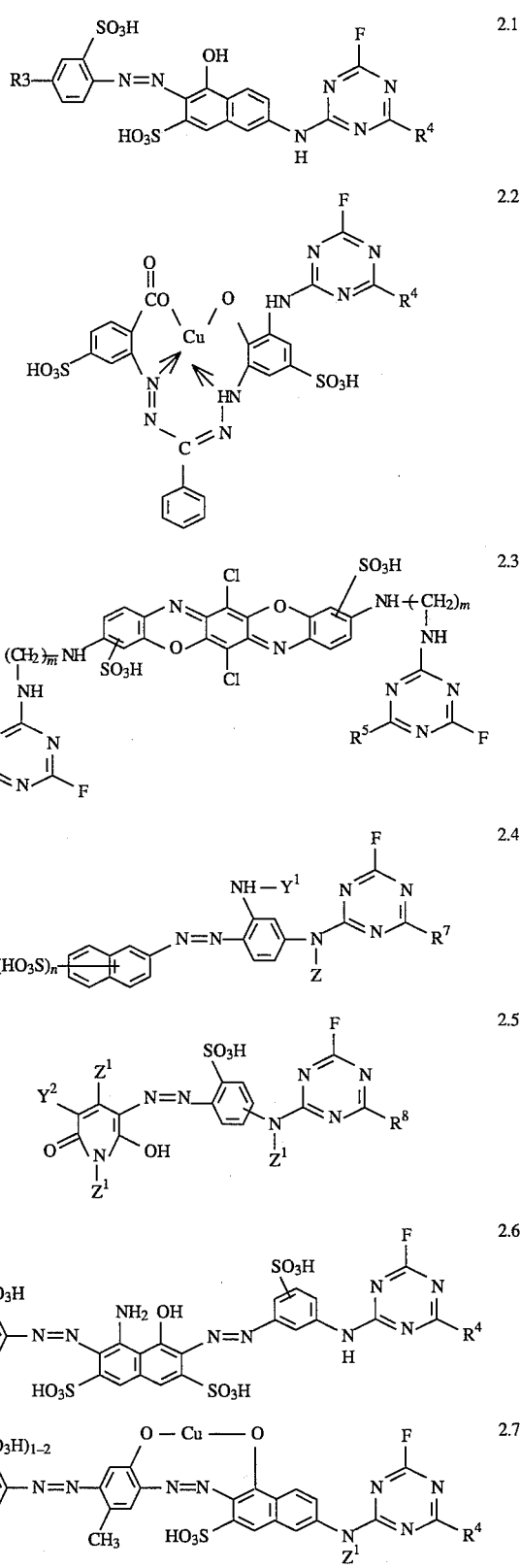
and at least one monofluorotriazine dyestuff 2 of the formula 2.1 to 2.7 or fluorochloropyrimidine dyestuff 3 of the formula 3.1 to 3.5

-continued

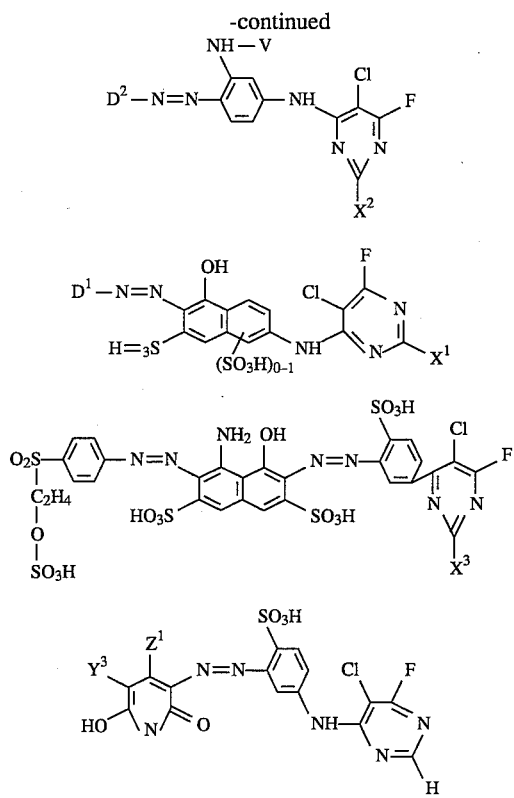

3.1

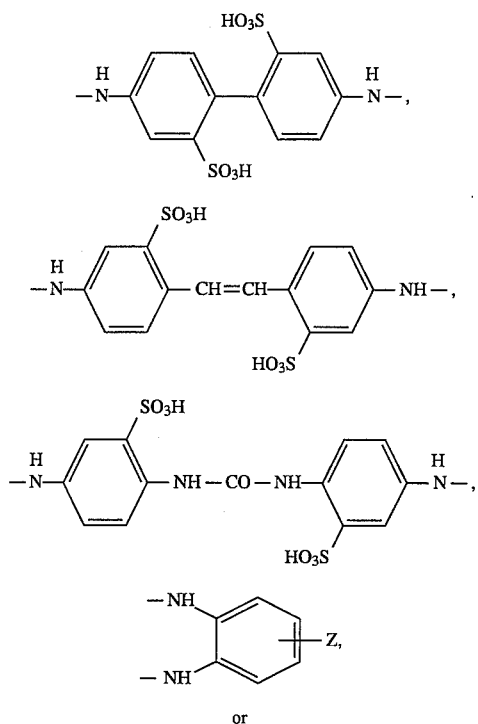

are mixed together, wherein

B$^1$–B$^4$ independently of one another denote

-continued

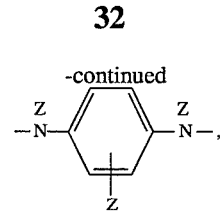

Q denotes O—CH$_3$ or H,

R$^1$ denotes —SO$_2$—CH$_2$—CH$_2$OSO$_3$H or

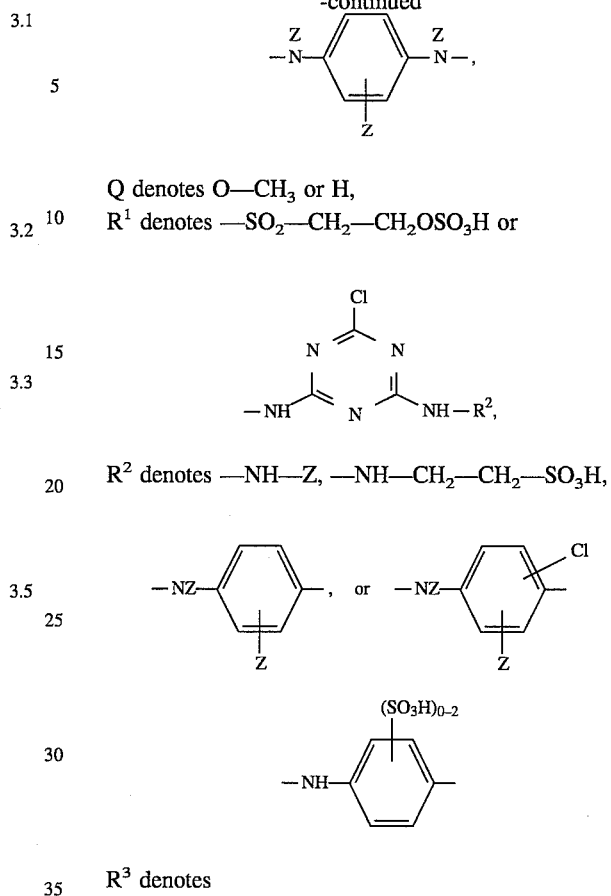

R$^2$ denotes —NH—Z, —NH—CH$_2$—CH$_2$—SO$_3$H,

R$^3$ denotes or H$_3$CO—,

R$^4$, R$^5$, R$^7$, and R$^8$ are independently of one another denote —NH—Z$^1$, —NH—CH$_2$—CH$_2$—SO$_3$H, the radicals Z independently of one another denote H or C$_2$–C$_4$-alkyl, the radicals Z$^1$ independently of one another denote H or C$_1$–C$_4$-alkyl, the radicals V independently of one another denote CONH$_2$ or COCH$_3$, W$^1$ denotes

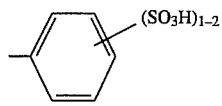

W$^2$–W$^5$ independently of one another denote

X$^1$–X$^4$ independently of one another denote H or F,
Y$^1$–Y$^3$ denote —CONH$_2$—, COCH$_3$ or —(CH$_2$)$_m$—SO$_3$H,
D$^1$ and D$^2$ denote

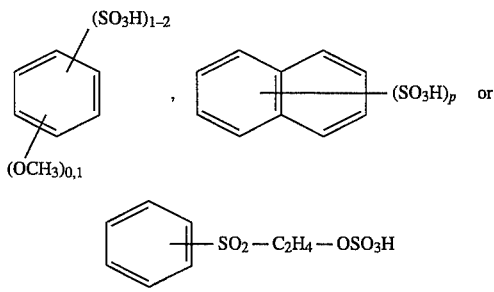

the indices m independently of one another denote 1–4,
the indices n independently of one another denote 2–4 and
the indices p independently of one another denote 1–3.

2. Mixture according to claim 1, characterised in that it additionally comprises the dyestuff 4.1 of the following formula

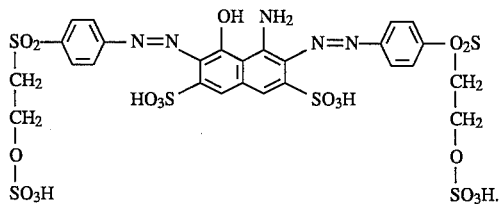

3. Mixture according to claim 2,
characterised in that it comprises the following, based on the sum of the dyestuffs
Dyestuff 1 : 40–60% by weight
Dyestuff 2 : 0–60% by weight
Dyestuff 3 : 0–60% by weight
Dyestuff 4.1: 0–60% by weight
at least one of the dyestuffs 2 and 3 being present.

4. Mixture according to claim 1,
characterised in that the dyestuff mixture further comprises 1 to 50 parts of an inorganic salt per 100 parts of dyestuffs.

5. Mixture according to claim 1,
characterised in that it further comprises 1 to 5 parts of an inorganic buffer, 0.5 to 10 parts of a dispersing agent and 0.5 to 5 parts of a dust removal agent per 100 parts of dyestuff, and the mixture has a pH of 6.5 to 7.5.

6. Process for dyeing cellulose fibres or fibre mixtures comprising cellulose, characterised in that a reactive dyestuff mixture according to claim 1 is applied to said fibres.

* * * * *

UNITED STATES PATENT AND TRADEMARK OFFICE
CERTIFICATE OF CORRECTION

PATENT NO. : 5,456,728
DATED : October 10, 1995
INVENTOR(S) : Schwarz, et al.

It is certified that error appears in the above-indentified patent and that said Letters Patent is hereby corrected as shown below:

Col. 30, line 2    After " or " insert -- one --

Col. 31, line 28   Delete " 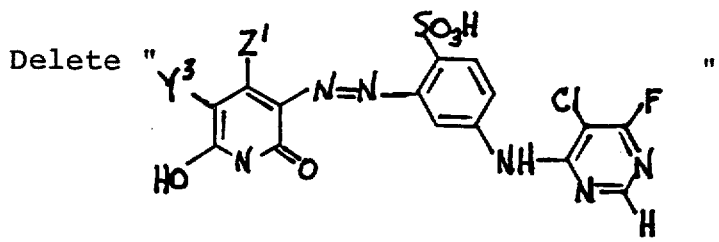 "

and substitute 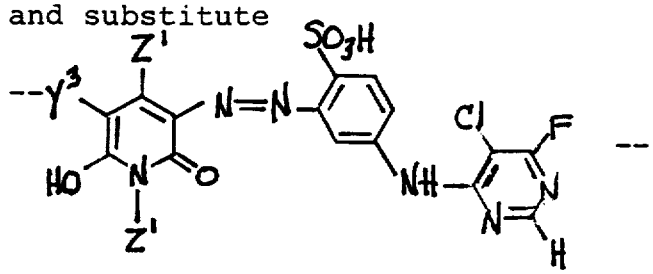 --

Col. 32, line 50   Delete " 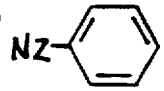 " and substitute

UNITED STATES PATENT AND TRADEMARK OFFICE
CERTIFICATE OF CORRECTION

PATENT NO. : 5,456,728
DATED : October 10, 1995
INVENTOR(S) : Schwarz, et al.

It is certified that error appears in the above-indentified patent and that said Letters Patent is hereby corrected as shown below:

Col. 32, line 50 Cont'd -- 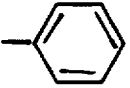 --

Signed and Sealed this

Ninth Day of January, 1996

Attest:

BRUCE LEHMAN

Attesting Officer     Commissioner of Patents and Trademarks